(12) United States Patent
Berg et al.

(10) Patent No.: US 8,179,320 B2
(45) Date of Patent: May 15, 2012

(54) POSITIONING METHOD AND DEVICES IN A MOBILE RADIO COMMUNICATIONS SYSTEM

(75) Inventors: Jan-Erik Berg, Sollentuna (SE); Jonas Medbo, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 203 days.

(21) Appl. No.: 12/665,633

(22) PCT Filed: Jun. 17, 2008

(86) PCT No.: PCT/EP2008/057614
§ 371 (c)(1),
(2), (4) Date: Dec. 28, 2009

(87) PCT Pub. No.: WO2008/155326
PCT Pub. Date: Dec. 24, 2008

(65) Prior Publication Data
US 2010/0201575 A1 Aug. 12, 2010

(30) Foreign Application Priority Data
Jun. 21, 2007 (SE) ...................... 0701512

(51) Int. Cl.
*G01S 3/02* (2006.01)
(52) U.S. Cl. ..................................... 342/450
(58) Field of Classification Search ................ 342/450
See application file for complete search history.

(56) References Cited

U.S. PATENT DOCUMENTS

| 5,990,826 A | 11/1999 | Mitchell |
| 7,016,115 B1 | 3/2006 | Leeb et al. |
| 2006/0275040 A1* | 12/2006 | Franklin ................ 398/172 |

OTHER PUBLICATIONS

Jackson, D. K. et al. "Fiat Lux: A Fluorescent Lamp Digital Transceiver." IEEE Transactions on Industry Applications, vol. 34, No. 2, May/Jun. 1998, pp. 625-630.
Kjaergaard, M. B. "Cleaning and Processing RSS Measurements for Location Fingerprinting." IEEE Third International Conference on Autonomic and Autonomous Systems, Jun. 1, 2007, 9 pages.
Melancon, P. et al. "Effects of Fluorescent Lights on Signal Fading Characteristics for Indoor Radio Channels." Electronics Letters, vol. 28, No. 18, Aug. 27, 1992, p. 1740.

* cited by examiner

*Primary Examiner* — Harry Liu
(74) *Attorney, Agent, or Firm* — Coats & Bennett, P.L.L.C.

(57) ABSTRACT

The present invention relates to a method and devices for determining the position of a user equipment in a mobile radio communications system. According to the invention, the position is determined via a distortion in a radio signal transmitted to or from the user equipment, wherein the distortion is caused by a scatterer being positioned at a particular location and having time-dependent scattering properties such that the scattering of a radio signal gives rise to a distortion by which said scattering properties may be identified.

21 Claims, 6 Drawing Sheets

POSITIONING METHOD AND DEVICES IN A MOBILE RADIO COMMUNICATIONS SYSTEM

TECHNICAL FIELD

The present invention relates to position determination in general and in particular to a method and arrangement for position determination in a mobile radio communications system.

BACKGROUND

Today, there are many systems that incorporate so called GPS-receivers, which utilize the satellite navigation system, GPS (Global Positioning System), in order to receive accurate information about, for example, the speed, direction or position of the GPS-receiver, and thereby also the device, system, vehicle etc. into which the receiver is potentially incorporated, such as for example an airplane, a car, a boat or even inside such small devices as cellular mobile telephones etc.

However, a well-known problem with GPS-receivers is that, while it is simple to determine, for example, the position in an outdoor environment with a high degree of accuracy using a GPS-receiver, it is often nearly impossible to determine the position in an indoor environment by using the GPS-receiver. This is because the received signal-strength of the GPS-signal is seriously attenuated by the walls and the roof of a building wherein the GPS-receiver is located.

SUMMARY

A problem to which the present invention relates in the problem of how to determine the position of a user equipment in a mobile radio communications system when the user equipment is located in an indoor environment.

This problem is addressed by a method of determining the position of a user equipment in a mobile radio communications system. The method is characterised in that the position is determined via a distortion in a radio signal transmitted to or from the user equipment, wherein the distortion is caused by a scatterer being positioned at a particular location and having time-dependent scattering properties such that the scattering of a radio signal gives rise to a distortion by which the scattering properties may be identified.

The object of the present invention is further achieved by a positioning device for determining the position of a user equipment in a mobile radio communications system. The positioning device is arranged to receive a radio signal having been transmitted to or from the user equipment, detect a distortion in the radio signal and extract, from the distortion, a logical content by which the position of the user equipment may be determined.

The object of the present invention is also achieved by a modulation device for determining the position of a user equipment in a mobile radio communications system The modulation device can be arranged to modulate the variation of the input current and/or voltage to at least one fluorescent lamp according to a pre-determined modulation pattern so that a radio signal interacting with a plasma in the fluorescent lamp will carry a distortion by which the position of the fluorescent lamp may be derived.

By the invention is achieved that position information about a user equipment in a mobile radio communications system may be obtained when the user equipment is located in environments that are unreachable by GPS-signals, such as for example indoor environments.

BRIEF DESCRIPTION OF THE DRAWINGS

The present invention will be described in more detail in the following with reference to the appended drawings, in which.

DETAILED DESCRIPTION

Figure 1:
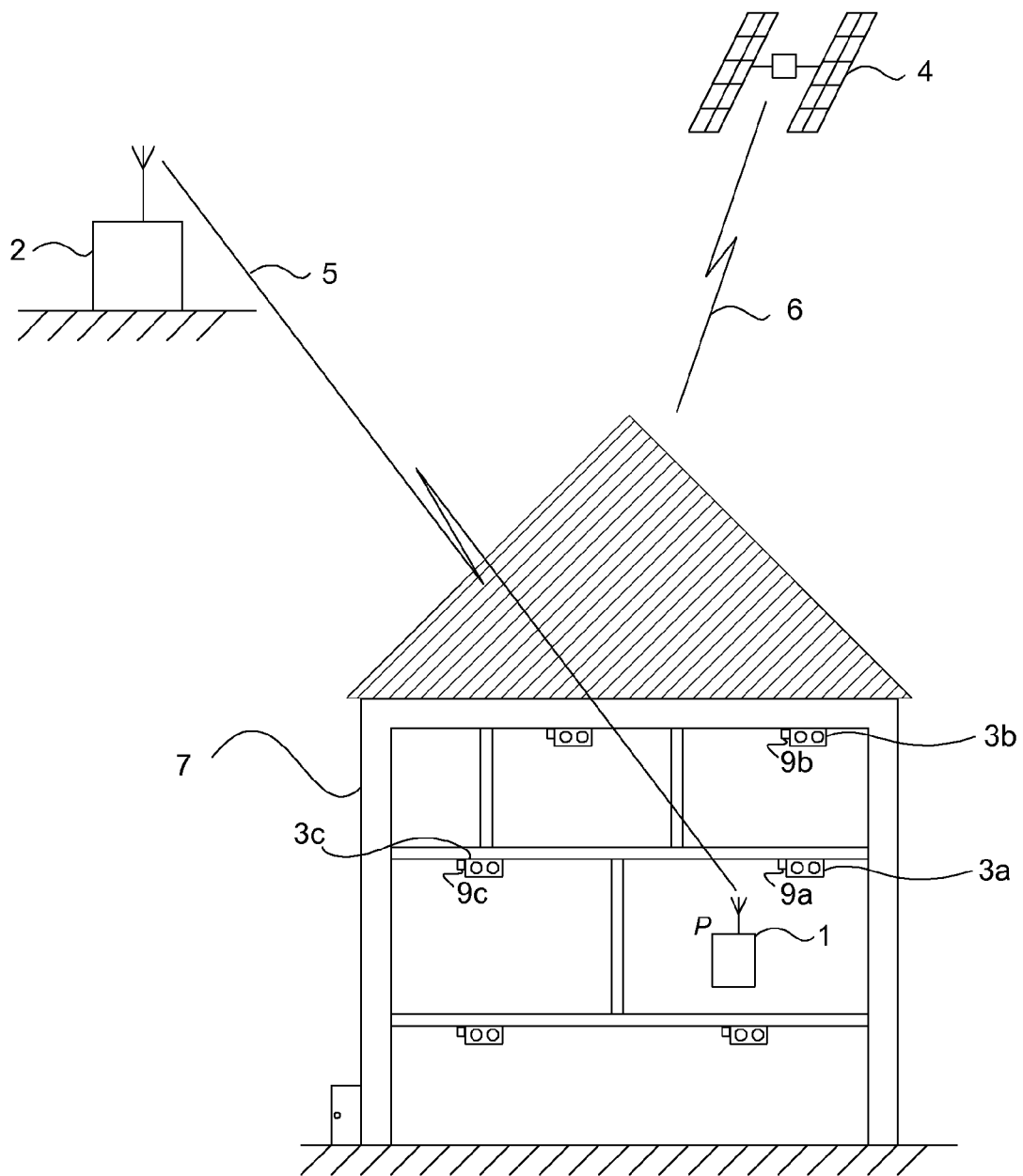
FIG. 1 illustrates a schematic overview of the present invention.

FIG. 1 illustrates an overview of an embodiment of the present invention. In FIG. 1, a GPS-satellite 4 is transmitting GPS-signals 6 down to earth. User equipment 1 is presently located inside a building 7. The user equipment 1 may comprise a mobile terminal, a personal computer with radio communication capabilities or other similar devices. Because of the attenuation of the roof and walls of the building 7, a GPS-receiver possibly incorporated in the user equipment 1 would not be able to receive the GPS-signals 6. The GPS-receiver would therefore be unable to determine its location and thereby also the location of the user equipment 1.

The user equipment 1 is, however, with or without a GPS-receiver, able to receive radio signals 5 from a base station 2. The radio signals 5 between the base station 1 and the user equipment 2 will however be distorted due to combination of the first arrived signal, which can be a direct line of sight wave, and/or echoes from objects (scatterers) in the environment.

Some scatterers have scattering properties that change with time, such as for example the plasma of a fluorescent lamp 3. The distortion of a radio signal 5 caused by a fluorescent lamp 3 is a result of the interaction between the radio signal 5 and the plasma inside the fluorescent lamp 3. The electromagnetic properties of the plasma inside the fluorescent lamps 3a-c change as the light is turned on and off, which in a 50 Hz mains system will occur about 100 times per second. When the fluorescent lamps 3a-c are turned on, the plasma inside each fluorescent lamp becomes excited and conductive, which means that the fluorescent lamps 3a-c then work as reflectors of radio signals 5. The effects on the radio signals emanating from the behaviour of the fluorescent lamps 3a-c are similar to the effects emanating from a metallic tube with a radius that is changing with time. The interaction with the plasma of a fluorescent lamp 3 will induce a change in amplitude and phase of radio signals 5 reflected off the fluorescent lamp 3a-c.

The phenomenon of such plasma distorting radio signals 5 is known from "Effects of fluorescent lights on signal fading characteristics for indoor radio channels", P. Melancon and J.

Lebel, ELECTRONICS LETTERS, Aug. 27, 1992, Vol. 28, No. 18, and occurs in most offices and buildings around the world.

According to the invention, the distortion of the radio signals 5 emanating from a scatterer having time-dependent scattering properties can be used for positioning purposes. In the following, the invention will, for purposes of illustration only, be described in terms of the scatterer being a fluorescent lamp, and it should be understood that the scatterer may be any scatterer for which a time-dependency of the scattering properties may be pre-determined.

The present invention uses echoes caused by plasma inside fluorescent lamps 3*a-c*, in order to determine the location of a user equipment 1. By modulating the current and/or voltage supply to a fluorescent lamp 3 in a predetermined manner, the distortion caused by the fluorescent lamp 3 on a radio signal 5 can be modulated. By applying different modulation patterns to different fluorescent lamps 3*a-c*, located at different positions, the fluorescent lamp 3 causing a particular distortion pattern in a radio signal 5 may be identified. If such a particular distortion pattern can be discerned in radio signals 5 being transmitted to/from a user equipment 1, it can be concluded that the user equipment 1 is located in the vicinity of a fluorescent lamp 3 giving rise to the particular distortion pattern.

The fluorescent lamps 3 may for example be ordinary fluorescent lamps, usually operating at 230 V or 110 V. For example, for a 50 Hz mains system wherein the fluorescent lamp 3*a* is turned on and off about 100 times per second, the time dependent distortion can be detected in the radio signals 5 between the user equipment 1 and the base station 2 as a 100 Hz amplitude and phase modulation of the received signal which produces two Doppler peaks at ±100 Hz. In short, the distortion of the radio signal 5 is a function of time in accordance with the modulation of the input current and/or voltage of the fluorescent lamps 3*a-c*.

Figure 2:
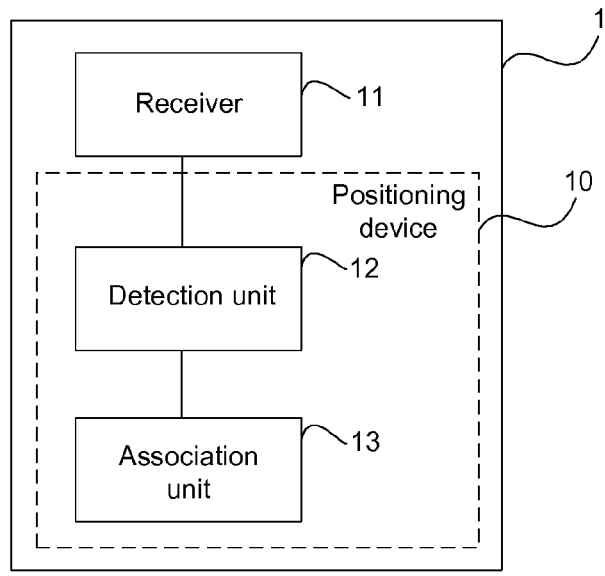
FIG. 2 shows a user equipment comprising a positioning device according to an embodiment of the present invention.

FIGS. 1 and 2 illustrate embodiment of the present invention wherein a positioning device 10 is located in a user equipment 1. Modulation devices 9*a-c* modulate the input current and/or voltage to the fluorescent lamps 3*a-c*, respectively, in order to obtain a specific modulation of the excitation of the plasma in the fluorescent lamp 3. A positioning device 10 in the user equipment 1 detects, in a detection unit 12, a specific distortion in the radio signal 5 that is caused by the specific modulation of a fluorescent lamp 3. In an association unit 13, a logical content Un that is carried by the specific modulation may be associated with the location P of the fluorescent lamp 3*a*. Thus, this embodiment of the present invention can be used for determining the location of the user equipment 1.

In FIG. 1, the user equipment 1, also shown in more detail in FIG. 2, is located in the vicinity of the fluorescent lamp 3*a*. The detection unit 12 of the positioning device 10 will detect a distortion in the down-link radio signal 5 received by the receiver 11 that has a significant peak or peaks in the frequency spectrum of the radio signal, wherein the peak or peaks corresponds to the specific modulation, described further in the following, of the fluorescent lamp 3*a*. Therefore, by detecting this peak or peaks in the radio signal frequency spectrum, the detection unit 12 in the positioning device 10 can determine a logical content Un that is transferred by the specific modulation of the fluorescent lamp 3*a*. The logical content Un can carry information by which the location P of the fluorescent lamp 3*a*, giving rise to the detected distortion, can be determined. The association unit 13 of the positioning device 10 can then associate the logical content Un of the distortion with the location P of the fluorescent lamp 3*a*. The location P of the fluorescent lamp 3*a* can for example be expressed as a geographical co-ordinate or be used so as to represent a single room, a hall, a staircase, a fire escape, a floor, a building etc. The location of the user equipment 1 determined as the location P of the fluorescent lamp 3*a* by the association unit 13, can then, for example, be accessed and used by an application in the user equipment 1 or be displayed to a user of the user equipment 1.

As mentioned above, the specific modulation is performed by the modulation device 9*a* so as to carry information relating to the location P of the fluorescent lamp 3*a*, i.e. to carry the logical content Un. The specific modulation is achieved by modulating the input current and/or voltage from the mains (or other power source) to the fluorescent lamp 3*a* from its ordinary stationary periodic variation to, for example, a unique specific stationary periodic variation, a phase modulated (PM) variation or a frequency modulated (FM) variation. It should be noted that other known modulation techniques also can be used to transfer the logical content Un and, although not described in the present invention, should be considered incorporated in the present invention.

If the specific modulation is a unique specific stationary periodic variation, that is, if the frequency of the ordinary stationary periodic variation of the input current and/or voltage to the fluorescent lamp 3*a* is changed to a specific frequency that is characteristic for the fluorescent lamp 3*a*, then the logical content Un can correspond to the specific frequency. The detection unit 12 in the user equipment 1 will then detect a distortion in the radio transmission channel that has a significant peak for the specific frequency in the frequency spectrum of the radio channel. The logical content Un can thus be extracted, for example by means of a Fast Fourier Transform (FFT) or by analysing the distorted signal in the time domain. In addition, since there are fluorescent lamp systems that change the modulation of the input current or voltage to fluorescent lamps from the mains 50 Hz (or 60 Hz) periodically shaped variation to a frequency as high as 50 kHz or higher (such high frequencies normally used in order to avoid flickering of the light output and/or producing lighter and more cost-effective fluorescent lamps), the specific frequency can be selected from a large range of frequencies. Hence, a sufficient number of values of the logical content Un can be obtained.

If the specific modulation is a frequency modulated (FM) variation of the ordinary stationary periodic variation of the input current or voltage to the fluorescent lamp 3*a*, each frequency in the combination may be arranged to represent a state, for example, a specific bit code. Hence, a particular frequency combination may correspond to a particular logical content Un. Similarly, if the specific modulation is a phase modulated (PM) variation of the ordinary stationary periodic variation of the input current or voltage to the fluorescent lamp 3*a*, each phase variation in the combination may be arranged to represent a state, for example, a specific bit code, and a particular combination of phase variations may correspond to the logical content Un. In both cases, the frequency combination or phase variation combination, respectively, may advantageously be continuously repeated in order to ensure efficient detection of the frequency or phase combination.

Since the distortion in the radio signal 5 caused by the modulated plasma will most often be a low-effect distortion, a radio signal 5 that is received by a receiver 11 connected to a positioning device 10 can advantageously be averaged over a time. Furthermore, the particular combination of frequencies/phase variations that correspond to a particular logical content Un could advantageously be selected in a manner so that the auto-correlation of the specific variation is high, for example by use of Barker codes.

A particular combination of phase/frequency variations representing the logical content Un could furthermore comprise of a series of shorter combinations of phase/frequency variations that each has been associated with a particular logical content. For example, if Barker codes are used, then a first Barker code could be arranged to represent a first number, for example "1", and a second Barker code could be made to represent a second number, for example "0". Other mappings of Barker codes on information content could also be made. By combining these Barker codes, any number could be conveyed by means of the distortion caused by the plasma. Alternatively, a single Barker code could be used repetitively, and information content could then be conveyed by means of phase shifts between repetitions of the single Barker code.

Figure 3:
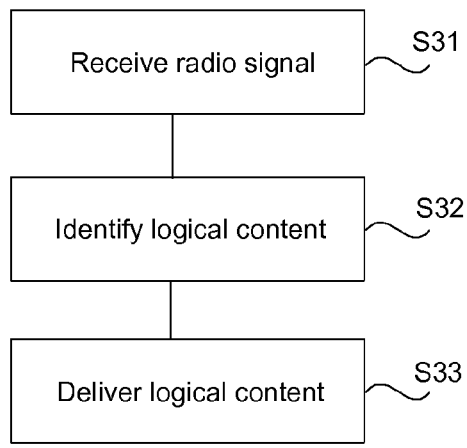
FIG. 3 is a flowchart illustrating the operation of a detection unit according to an embodiment of the present invention.

If a radio signal 5 that is received by a positioning device 5 has travelled in the vicinity of a fluorescent lamp 3, the detection unit 12 in the positioning device 10 will detect a distortion in the radio transmission channel signal 5. In FIG. 3, a flowchart illustrating an exemplary operation of a detection unit 12 is illustrated. In step S31, a radio signal 5 comprising a distortion caused by a fluorescent lamp 3 is received. In step S32, the distortion is identified. If the specific modulation of the fluorescent lamp 3 is a phase or frequency modulation, the identification in step S32 can advantageously be performed by use of an auto-correlation analysis of the received radio signal 5, either in the frequency or time domain. A detection unit 12 that has access to information about the possible combinations of frequencies/phase variations that may be used for the modulation of a fluorescent lamp 3 can thus, by performing auto-correlation operations on the received radio signal 5 in respect of such possible combinations, identify which combination(s) of frequencies/phase variations were used to modulate the fluorescent lamp 3 having given rise to the distortion in the received radio signal 5. If the modulation of the fluorescent lamp 3 is a specific stationary periodic variation, then the identification of the logical content Un can advantageously be performed by means of a Fast Fourier Transform (FFT). When the logical content Un has been identified, the detection unit 12 delivers a signal indicative of the logical content Un to an output of the detection unit 12.

In some cases, the logical content Un may in itself give information about the position of the user equipment 1. This may for example be the case when a base station 2 has instructed a modulation device 9 to use a particular modulation (see below), or if the modulation is a specific stationary periodic variation, wherein the frequency of the periodic variation has been selected so that the frequency in itself carries information about the position of the user equipment 1. However, in many cases, the extracted logical content Un will be conveyed to an association unit 13, wherein the logical content Un can be associated with the geographical co-ordinate or location P of the fluorescent lamp 3a.

Figure 4:
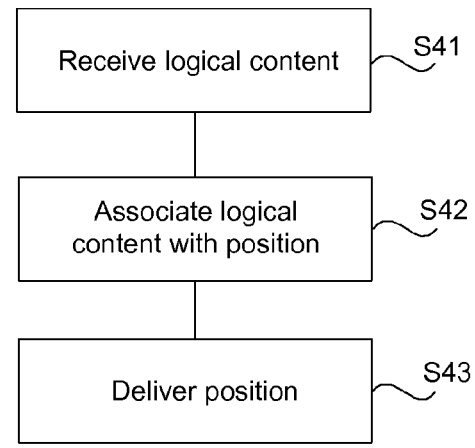
FIG. 4 is a flowchart illustrating the operation of an association unit according to an embodiment of the present invention.

An embodiment of the operation of an association unit 13 is schematically illustrated in FIG. 4. In step S41, a signal indicative of the logical content Un is received. In step S42, the logical content Un is associated with a position. In one implementation of the invention, the association unit 13 has access to a look-up table or other database wherein the different values of the logical content Un that are used by different modulation devices 9 of different fluorescent lamps 3 are stored together with the locations P of such different fluorescent lamps 3. In this implementation, step S42 involves searching the look-up table/database for the logical content Un received in step S41. In another implementation of the invention, the logical content Un may consist of different parts, for example a first part (for example a first Barker code or first set of Barker codes) including information on the value of a first digit in a number, a second part including information on a second digit in a number, etc. The number or other code represented by the complete logical content Un could for example correspond to a geographical position in terms of latitude, longitude and elevation, to an identification of the fluorescent lamp 3, or any other information. Also in this implementation, a look-up table/database may be useful. For example, in the example where a particular set of Barker codes corresponds to a particular number, the look-up table/database could include information on which set of Barker code corresponds to which number. In this implementation, the association performed in step S42 could then include searching the look-up table/database for the different codes conveyed by the different parts of the logical content Un, in order to retrieve the information encoded by means of different parts of the logical content Un. In step S43, the association unit 13 may be arranged to deliver a signal indicative of the position of the user equipment 1 to an output of the association unit 13.

A specific modulation, whether phase or frequency modulation, may be performed by the modulation devices 9a-c for a single fluorescent lamp (e.g. in a single room) or for a set of fluorescent lamps (e.g. a corridor or fire escape) depending on the desired accuracy of the indoor positioning system. A specific modulation may also be performed by a modulation devices 9a-c at a shared power supply—for example at a shared connection to the mains or the like—for an entire set of fluorescent lamps 3a-c.

The present invention provides a possibility to incorporate a Z-coordinate in a geographical position that correspond to elevation and thereby enable a positioning device 10 to, for example, identify on which floor of a building the user equipment 1 is currently located.

The higher the frequency of the modulation of the fluorescent lamp, the higher may the information throughput be from the fluorescent lamps 3 to the positioning device 10. When the fluorescent lamps 3a-c have an average frequency of 50 Hz, the information throughput is around the order of 1 to 10 bits/second. Although this information throughput may be considered low for some applications, it still makes it possible to use the method according to the present invention as long as the mobile cellular connection of the radio transmission has a sufficient duration in time so that the logical content Un conveyed by the distortion may be discerned. The higher the frequency of the modulation, the shorter will the required duration time of the connection be.

Furthermore, it is advantageous to have a clear line of sight between the user equipment 1 and the closest fluorescent lamp 3. However, the effect of the distortion is generally not attenuated by for instance a human being standing or moving in the line of sight, since the scattering (echoes) is rich in indoor environments and thus it is likely that one or more strong echoes will hit the fluorescent lamp.

It should also be noted that the phenomenon addressed in the present invention exist when there is a short distance of a few meters between the user equipment 1 and the fluorescent lamps 3a-c. However, the maximum distance between the fluorescent lamps 3a-c and the user equipment 1 for the user equipment 1 to be able to detect the distortion is yet to be determined, but can safely be assumed to be less than 100 meters.

In the embodiment of the invention illustrated in FIG. 2, the positioning device 10 is located in a user equipment 1, and a distortion caused by a fluorescent lamp 3 is detected in a downlink radio signal 5. However, the positioning device 10 may alternatively be connected to the receiver 11 of a radio base station 2 and located in the radio base station 2, or in another node connected thereto. A distortion may then be detected in an uplink radio signal 5 that has been transmitted by a user equipment 1 which is located in the vicinity of a fluorescent lamp 3. This embodiment can, for example, be advantageous in determining if a user equipment 1 is located at a specific location for increased security as a user equipment 1 is entering a protected zone or in a money transfer procedure etc.

Furthermore, in FIG. 2, the positioning device 10 connected to receiver 11 comprises a detection unit 12 and an association unit 13. In other implementations of the invention, the association unit 13 may be located elsewhere, and a signal indicative of a distortion detected by the detection unit 12 may be transmitted to by the positioning device 10 to the association unit 13.

Figure 5:
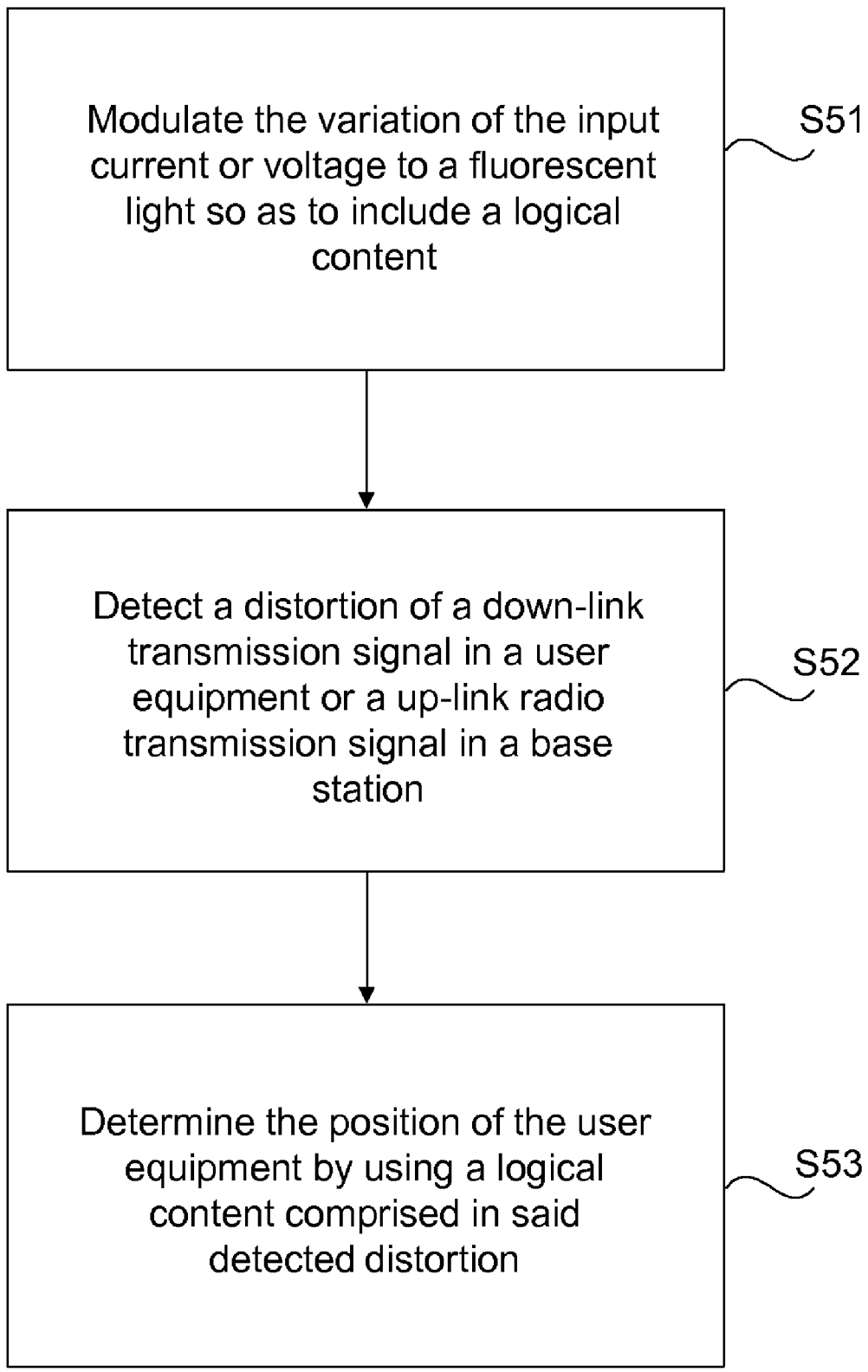
FIG. 5 is a flowchart schematically illustrating an embodiment of the inventive method.

In FIG. 5, a general overview of a method according to the present invention is described. First, in step S51, the input currents or voltages to the fluorescent lamps 3a-c are modulated by the modulation devices 9a-c according to a modulation technique, so as to carry the logical content Un. In step S52, the detection unit 12 of a positioning device 10 detects and identifies a distortion in a radio signal 5 which has been transmitted to or from a user equipment 1 located in the vicinity of the fluorescent lamp 3. In step S53, an association unit 13 can associate the logical content Un with a location P of the fluorescent lamps 3a-c and thereby determine the position of the user equipment 1. In embodiments wherein the distortion in itself provides sufficient information about the position of the user equipment 1, step S53 is not necessary.

If the association unit 13 and the positioning device 10 including the detection unit 12 are located in different devices (e.g, the positioning device 10 in the user equipment 1 and the association unit 13 in the radio base station 2, or vice versa), then the flowchart in FIG. 5 may include a step wherein a signal indicative of the distortion detected in step S52 is transmitted to the association unit 13. Step S53 of FIG. 5, in which the position of the user equipment 1 is determined based on the detected distortion, could then be performed in the association unit 13. This may be advantageous in some instances. For example, to implement the association unit 13 in the radio base station 2 when the positioning device 10 is included in the user equipment 1 may be preferable if the information about the position of the user equipment 1 is to be used by an application that requires a lot of processing, since the base station 2 often has higher processing capabilities than the user equipment 1.

According to the invention, a fluorescent lamp 3, or a group of fluorescent lamps 3, is modulated according to a modulation pattern giving rise to a distortion which can be distinguished from distortions caused by fluorescent lamps 3 modulated according to other modulation patterns. A plurality of distinguishable modulation patterns are hence required in order to allow position determination within a large area. However, since information on with which base station(s) 2 a user equipment 1 can currently communicate provides coarse information on the location of the user equipment 1, the modulation patterns may be re-used at sufficiently large distances.

Figure 6:
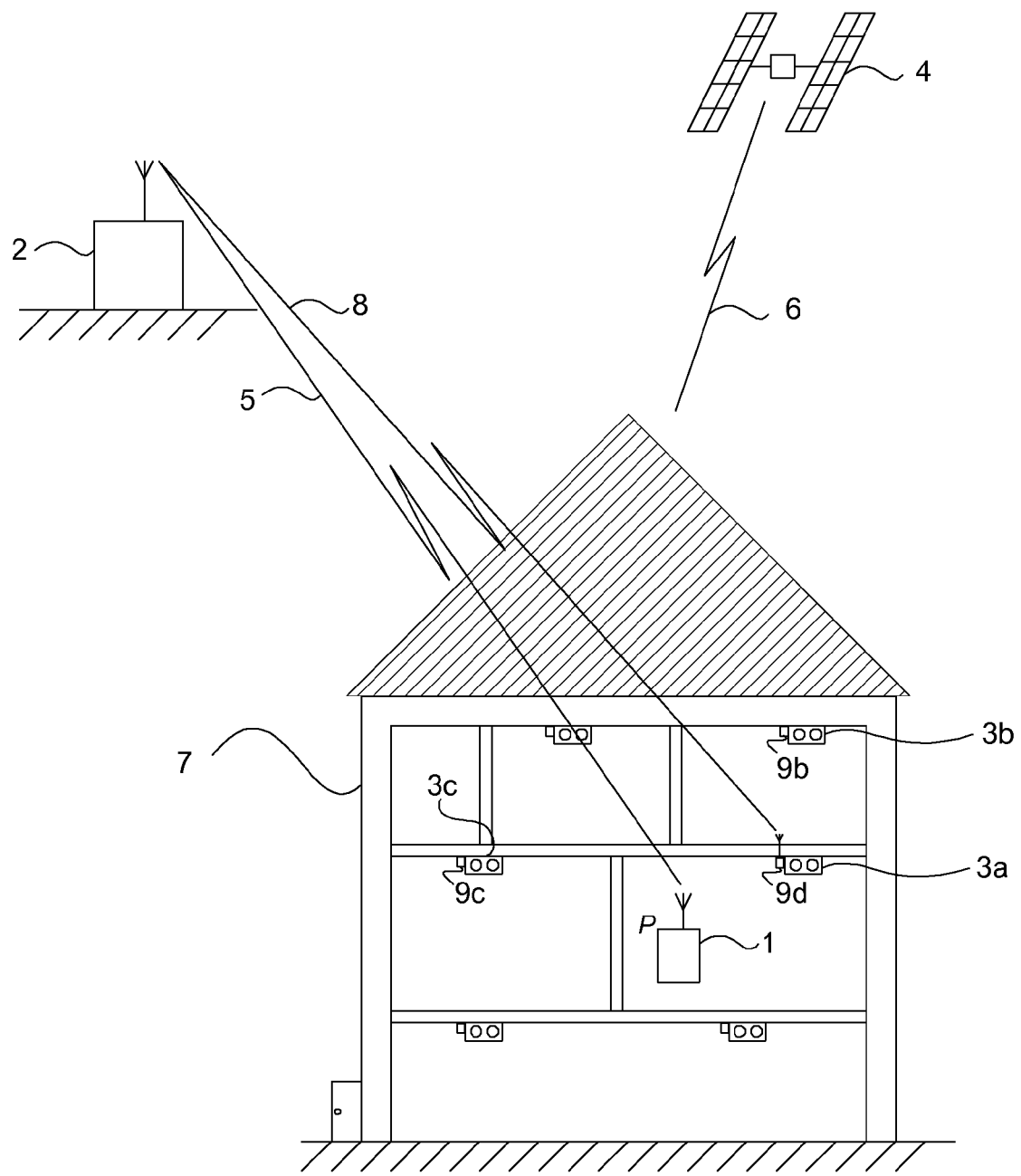
FIG. 6 shows a schematic overview of an embodiment of the present invention.

According to a further embodiment illustrated in FIG. 6, the base station 2 is arranged to transmit modulation control information 8, for example, a modulation control signal or the logical content Un, to a modulation device 9d. Modulation device 9d of FIG. 6 is connected to fluorescent lamp 3d and comprises a radio signal receiver. Modulation device 9d is adapted to modify the modulation pattern applied to the fluorescent lamp 3d according to instructions received by the base station 2.

Figure 7:
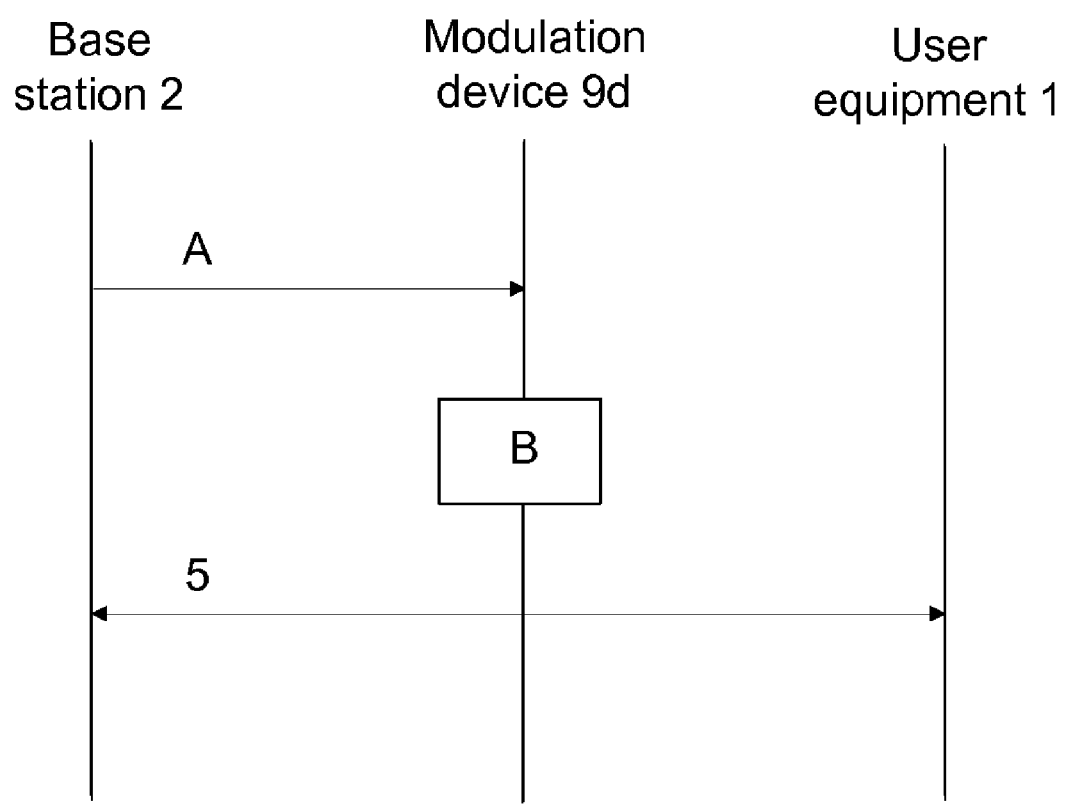
FIG. 7 shows a signalling diagram according to an embodiment of the present invention.

FIG. 7 is a signalling diagram illustrating an example of signalling that may occur in the embodiment illustrated in FIG. 6. A modulation control signal A, including instructions to the modulation device 9d, is sent from the base station 2 to the modulation device 9d. Such modulation control signal A could e.g. include a reference to particular modulation control instructions stored in the modulation device 9d. Modulation device 9d would then include storage for a plurality of different modulation control instructions. Alternatively, the modulation control signal A sent from the base station 2 could include explicit modulation control instructions. Such explicit modulation control instructions could for example include information on a particular frequency to be used in the modulation.

In response to modulation control signal A, modulation device 9d adapts, in event B, the modulation of the plasma of fluorescent lamp 3d according to the instructions included in modulation control signal A. An acknowledgment may be transmitted from the modulation device 9d to the base station 2.

Radio signals 5 are then transmitted between the base station 2 and the user equipment 1, wherein a distortion caused by the fluorescent lamp 3d can be detected if the user equipment 1 is located in the vicinity of fluorescent lamp 3d.

This embodiment can be used, for example, in a security control system to check if a user equipment 1 is located at a specific location, or not, at a given moment in time. For example, if it is to be confirmed whether a user equipment 1 is in the vicinity of fluorescent lamp 3d, instructions to modulate the plasma of fluorescent lamp 3d in a particular manner can be sent to the modulation device 9d. Radio signals 5 being sent/received by user equipment 1 would then, if the user equipment 1 is in the vicinity of fluorescent lamp 3d, include a distortion corresponding to the particular modulation of the plasma of fluorescent lamp 3d. If user equipment 1 includes a positioning device 10, then user equipment 1 may be requested to detect the distortion and transmit to the radio base station 2 a signal indicative of the detected distortion. Alternatively, if the radio base station 2 includes a positioning device 10, then the distortion may be detected in an uplink radio signal 5. In this embodiment, the user equipment 1 may be requested to transmit an uplink radio signal 5 to the radio base station 2 so that the distortion may be detected. Often, an ongoing exchange of signals between the radio base station 2 and the user equipment 1 may be used for this purpose. For example, if the security control is performed in relation to a monetary transaction performed by use of the user equipment 1, the distortion may be detected in any signal relating to this transaction and transmitted from the user equipment 1, and no separate request for the transmission of a signal need be sent to the user equipment 1.

Figure 8:
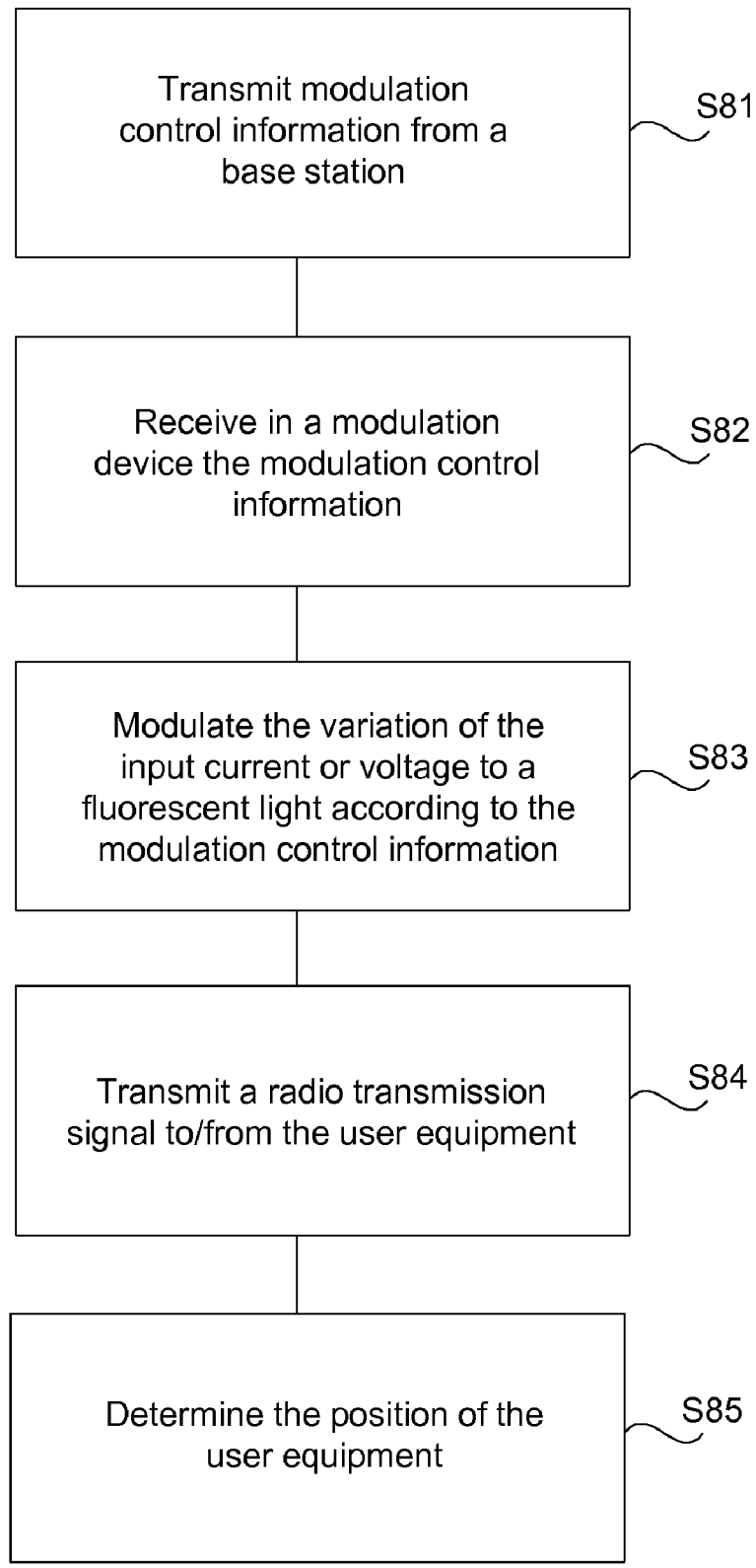
FIG. 8 shows a flowchart according to an embodiment of the present invention.

FIG. 8 is a flowchart illustrating the embodiment of the invention wherein a radio base station 2 may instruct a modulation device 9d to induce a particular modulation to the plasma of a fluorescent lamp 3d. In step S81, a modulation control signal A is transmitted from the base station 2 to the modulation device 9d. The modulation control signal A is received by the modulation device 9d in step S82.

In step S83, the modulation device 9d modulates the input current and/or voltage to the fluorescent lamp 3d according to the information carried by the modulation control information signal received in step S82.

In step S84, a radio signal 5 in which a distortion may be detected is transmitted to or from the user equipment 1. When the positioning device 10 is located in the user equipment 1, the radio signal 5 may be transmitted from the base station 2. The radio signal 5 could then advantageously include an instruction to user equipment 1 to perform a position determination. When the positioning device 10 is located in the base station 2, an additional step, wherein the user equipment 1 is requested to transmit a radio signal 5 in which a distortion may be detected, could be included prior to step S84, or the base station 2 could wait for a radio signal 5 to be transmitted by the user equipment 1.

In step S85, the position of the user equipment is determined. If this determination is performed in the user equipment 1, an additional step, wherein a signal indicative of the result of the position determination is transmitted from the user equipment 1 to the base station 2, may advantageously be added. If the distortion detected in radio signal 5 transmitted to/from the user equipment 1 corresponds to the modulation of the modulation instruction carried of the modulation control signal A sent in step S81, then the base station 2 knows that the user equipment 1 is in the proximity of the fluorescent lamp 3d. The position of a user equipment 1 may here be expressed as a particular modulation pattern, since the device requesting the position is aware of the modulation pattern applied by the modulation device 9d. No association between a logical content Un and a position need then be performed, and no association unit 13 is needed. However, a position expressed as a geographical coordinate or a position within a building, as described above, may alternatively be used.

The modulation device 9d can also be arranged to modulate the input current or voltage to one or several of the fluorescent lamps 3b-d, as previously described.

The detection of a distortion induced by a modulated fluorescent lamp 3 may for example be performed on radio signals 5 carrying other information, such as speech or data, or control signals relating to the transmission of speech or data. Alternatively, the detection may be performed on radio signals 5 especially arranged to facilitate detection of a distortion, hereinafter referred to as positioning determination radio signals. Such positioning determination radio signals could for example include a known content, so that any distortion caused by the interaction with a fluorescent lamp 3 may be easily distinguished from the radio signal carrying the known content. When the position of a user equipment 1 is requested (for example by a user of the user equipment 1 or a base station 2), a positioning determination radio signal could be transmitted to or from the user equipment 1, depending on whether the positioning device 10 is located in the base station 2 or the user equipment 1. A positioning determination radio signal could advantageously be transmitted during a duration of time that is sufficient for the positioning device to determine a distortion. Alternatively, the positioning determination radio signal could be repeatedly transmitted until the positioning device indicates that the distortion determination operation has ended.

An advantage of the present invention is that it is not affected by changes in the indoor lighting conditions, such as increased sunlight or shadows.

It should also be added, as indicated earlier, that the distortion provided by the fluorescent lamps 3, also can be provided by any other form of controllable time-variant scatterer of radio signals, such as metallic objects having shapes that vary with time. Further, if there are reasons for not having fluorescent lamps 3a-c lighting up a certain room, such as a dark room used for developing a film etc., it would be possible to cover the fluorescent lamps 3a-c with any suitable opaque dielectric material, such as, for example, any form of plastic material. This would shield the room from the light emitted by the fluorescent lamps 3a-c, yet still allow the detection of the distortion of the radio signals.

The present invention can provide a low cost and accurate positioning system, without any need for indoor antennas or signal repeaters. Hence, positioning by use of the invention does not need to give rise to any additional radio frequency radiation. Furthermore, the invention may use an already present fluorescent lamp system to act as scatterers of the radio signal, thereby further reducing the costs.

The present invention, as described in the embodiments above, introduces many new areas of application, for example, computer programmes, present in a user equipment 1, which can use the information about the position of the user equipment 1 in order to provide a wide variety of services, such as providing tourist information and/or directions inside large buildings etc. A user of the user equipment 1 could then, for example, be guided by an application showing a map of a large office complex, factory floor or a museum etc. wherein the position of the user equipment 1 and thereby also the user may be informatively displayed. This allows a user to be easily oriented in indoor environments and can be provided with instructions on how to get to a desired location. As suggested in the embodiments above the present invention may also be used in different security applications, secure monetary transactions or the like. It may also be added that various combinations of the embodiments mentioned above can be used in order to tailor an appropriate positioning system for the different areas of application and should be considered, although not described in detail, as included in the present invention.

The invention claimed is:

1. A method of determining the position of a user equipment in a mobile radio communications system, said method comprising:
   detecting distortion in a radio signal transmitted to or from the user equipment, wherein the distortion is caused by a scatterer being positioned at a particular location and having time-dependent scattering properties associated with said location, such that the scattering of a radio signal caused by the scatterer gives rise to distortion from which said time-dependent scattering properties may be identified;
   determining the position of the user equipment based on identifying in the detected distortion a logical content associated with said time-dependent scattering properties of the scatterer.

2. The method of claim 1, wherein the scatterer is a fluorescent lamp.

3. The method of claim 1, wherein said detecting comprises receiving the radio signal that has been transmitted to or from the user equipment, and detecting the distortion in the received radio signal.

4. The method of claim 1, further comprising associating the logical content, as identified from the detected distortion, with the particular location of the scatterer.

5. The method of claim 1, wherein said determining the position of the user equipment comprises using a look-up table or other database that associates detected distortion with specific geographical positional coordinates or locations.

6. The method of claim 1, wherein said determining the position comprises using the identified logical content to access a look-up table or other database that identifies a plurality of scatterers according to the logical content associated with their respective time-dependent scattering properties, and associates each scatterer with its corresponding geographical positional coordinates or location.

7. The method of claim 1, wherein said detecting distortion is performed in said user equipment.

8. The method of claim 1, wherein said detecting distortion is performed in a base station.

9. The method of claim 1, further comprising modulating the variation of an input current or voltage to a fluorescent lamp, acting as said scatterer, according to a pre-determined modulation pattern in order to cause, as said logical content, a particular distortion pattern in the radio signal.

10. The method of claim 9, further comprising transferring a modulation control signal to a modulation device connected to said fluorescent lamp, the modulation control signal comprising information determining or indicating the pre-determined modulation pattern.

11. A positioning device for determining the position of a user equipment in a mobile radio communications system, the positioning device configured to:
receive a radio signal having been transmitted to or from the user equipment;
detect a distortion in the radio signal caused by the scattering of said radio signal by a scatterer being positioned at a particular location and having time-dependent scattering properties associated with said location;
identify, in said distortion, a logical content associated with said time-dependent scattering properties by which the position of the user equipment is determined.

12. The positioning device of claim 11, wherein said positioning device is configured to use the logical content identified in the detected distortion to determine the position of said user equipment.

13. The positioning device of claim 11, wherein the positioning device determines the position of the user equipment based on accessing a look-up table or database that associates detected distortion or information corresponding to detected distortion with specific geographical positional coordinates or locations.

14. The positioning device of claim 11, wherein the positioning device is included in a user equipment.

15. The positioning device of claim 11, wherein the positioning device is included in a base station.

16. A modulation device for determining the position of a user equipment in a mobile radio communications system, said modulation device configured to:
modulate the variation of the input current or voltage to at least one fluorescent lamp according to a pre-determined modulation pattern to cause plasma in the fluorescent lamp to cause distortion in a radio signal transmitted to or from the user equipment; wherein said distortion carries logical content according to the pre-determined modulation pattern such that the distortion can be detected in the radio signal and used for determining the position of the user equipment.

17. The modulation device of claim 16:
wherein the modulation device includes a radio receiver;
wherein said radio receiver is configured to receive a modulation control signal;
said modulation device being arranged to modulate the variation of the input current or voltage to said at least one fluorescent lamp in dependence on information carried by said modulation control signal.

18. The modulation device of claim 16, wherein said modulation device is configured to be connected to at least two fluorescent lamps.

19. The modulation device of claim 18, wherein said modulation device is arranged to be connected to at least two fluorescent lamps via a shared power supply.

20. The modulation device of claim 16, wherein the modulation device is included in a fluorescent lamp system having at least one fluorescent lamp connected to the modulation device.

21. A method of determining the position of a user equipment in a mobile radio communications system, wherein the user equipment is operating in an environment in which a number of fluorescent lamps at known locations each distort radio signals transmitted to or received from the user equipment according to a characteristic distortion pattern, wherein said method comprises:
receiving a radio signal transmitted to or received from the user equipment and detecting distortion in the radio signal;
identifying a distortion pattern in the detected distortion;
using the identified distortion pattern to identify the particular fluorescent lamp causing said detected distortion and thereby identify the location of the user equipment, based on accessing a look-up table or database that associates the characteristic distortion patterns of the fluorescent lamps with corresponding location information.

* * * * *